Nov. 30, 1926.
A. MACDONALD
1,608,607
LUGGAGE RACK OR CARRIER FOR MOTOR AND THE LIKE VEHICLES
Filed April 24, 1925
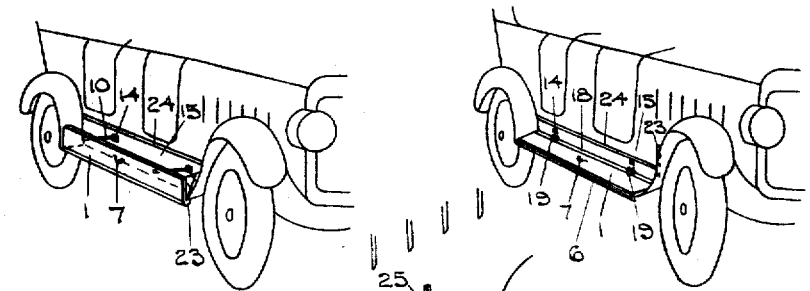
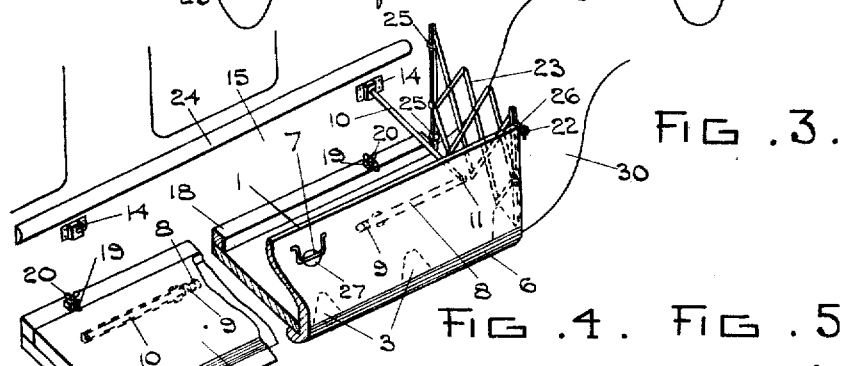
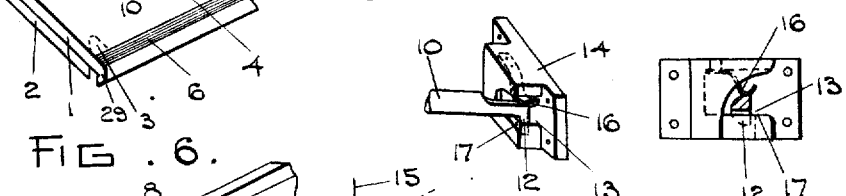
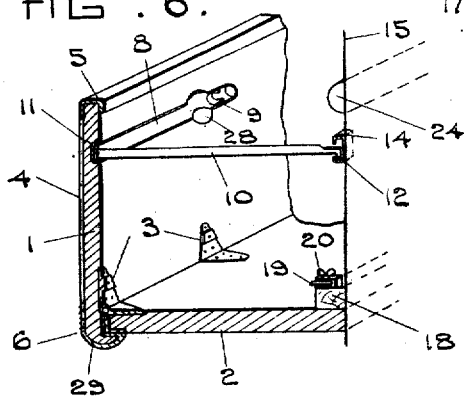
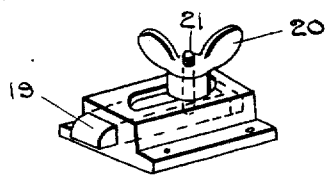
Alexander Macdonald
INVENTOR;
By
his Attorney.

Patented Nov. 30, 1926.

1,608,607

UNITED STATES PATENT OFFICE.

ALEXANDER MACDONALD, OF ROSLYN, DUNEDIN, NEW ZEALAND.

LUGGAGE RACK OR CARRIER FOR MOTOR AND THE LIKE VEHICLES.

Application filed April 24, 1925. Serial No. 25,506, and in New Zealand July 18, 1924.

The object of this invention is to provide a handy and comparatively cheap carrier or rack for motor vehicles. The idea underlying the invention is to make use of the usual footboard of the vehicle as part of the carrier and so that the footboard may also be used when desired.

This idea is carried into effect by the preferred embodiment of the invention hereinafter described and illustrated in the accompanying drawings in which Figure 1 is a view of the carrier open for use as applied to a car, Figure 2 is a view of the carrier closed as applied to a car, Figure 3 is a perspective view showing part of the carrier open and part closed, Figure 4 is a perspective view of one of the clasps used in securing the carrier to the car, Figure 5 is an elevation of one of the clasps referred to in Figure 4, Figure 6 is a sectional perspective view of the carrier open as in use and showing the means for securing the carrier to the car, Figure 7 is a perspective view of one of the fastening catches used.

According to my invention a special footboard 1 is attached to the ordinary footboard 2 by hinges 3. This special footboard 1 has its upper surface covered with sheet rubber 4 and its free edge strengthened with metal protecting strip 5 see Figure 6 and its hinged edge 29 strengthened by a nonslipping strip 6. This edge 29 is hook-shaped in cross section and is adapted to engage under the outer edge of the footboard 2, when the footboard 1 is placed in vertical position to act as part of the carrier. This edge 29 contributes to hold the footboard 2 firmly.

In the upper surface of the special footboard 1, there is fitted a flush handle 7 with finger grip recess 27 and in the under side two recesses 8 (widened at 28 for finger grip) in each of which recesses 8 at opposite ends thereof there is a spring clip 9 of any suitable kind. A stay rod 10 is attached with pivot pins 11 to other ends of the recesses. These stay rods 10 have their free ends bent down to form a shoulder 12 see Figures 4 and 5 arranged to fit into recesses 13 formed for its reception in clasps 14 secured to side of car 15.

Inside the recess 13 of the clasps 14 there are fitted flat springs 16 which press the shoulders 12 of the stay rods 10 down so as to be engaged by lip 17 and so prevented from being pulled out of the recess.

Attached to the usual footboard 2 next to the side of the car 15 there is a batten 18 of about the same thickness as the special footboard 1. On top of this batten 18 there are mounted two fastening catches 19 see Figure 7 which can be moved in, out or locked, by the working of wingnuts 20 screwed on studs 21 attached to the catches 19.

At the front end (or both ends) of the special footboard 1 is fastened a collapsible screen 23 to side of car 15 with fastening pieces 25 to prevent articles in the carrier from dropping out past the front mudguard 30. A loose hook 26 of collapsible screen 23 engages in a screw eye 22 in the upper edge and at the front end of special footboard 1. A half round bead 24 is attached to the side of car 15 in line with the top edge of the special footboard 1 to prevent baggage in the carrier scratching the paint of the car. When the special footboard 1 is in closed position see Figures 2 and 3 the sheet rubber 4 thereon is uppermost and is trod by persons entering the car and any tendency of the special footboard 1 to tip is prevented by the catches 19 which come in contact with the metal protecting strip 5.

To put the carrier in position for use from the closed position see Figures 1, 3 and 6, the catches 19 are withdrawn by slackening off wingnuts 20 and pressing them towards the side of car 15. The special footboard 1 is then lifted to the vertical position by means of the flush handle 7; the stay rods 10 are pulled out from their recesses 8 in which they are held by spring clips 9; the shoulder 12 end of the stay rods 10 being swung radially on pivot pins 11 over to the clasps 14 (see Figures 4 and 5) which are attached to side of car 15, and pressed against flat springs 16 which lift and allow the shoulders 12 to pass over the lips 17 and drop into recesses 13.

The collapsible screen 23 is drawn out from the side of car 15 and the loose hook 26 engaged in screw eye 22.

To close up the carrier again, disengage loose hook 26 of the collapsible screen 23 from screw eye 22, and push the said screen against the side of car 15, the shoulders 12 at end of stay rods 10 are lifted against the pressure of flat springs 16 and the rods 10 are swung clear of lips 17; the rods 10 are pressed into their recesses 8 and the special footboard 1 is pressed down into the horizontal position; the catches 19 are then drawn out and fastened by tightening the wing nuts 20.

Claims.

1. An improved luggage carrier for motor vehicles and the like, comprising an upper foot-board hinged to the outer end of the ordinary footboard or running board of a motor vehicle, two longitudinal recesses on the under side of said upper footboard, retaining clips at the inner ends of said recesses, stay rods pivotally attached to the other ends of said recesses and adapted when said upper footboard is closed to be held in said recesses by said retaining clips, and when said upper footboard is opened to retain same in such opened position by engaging the side of the vehicle, substantially as described.

2. An improved luggage carrier as claimed in claim 1, including clasps secured to the side of the vehicle into which the ends of said stay rods are adapted to be recessed, substantially as described.

In testimony whereof I affix my signature.

ALEXANDER MACDONALD.